(12) United States Patent
Choi et al.

(10) Patent No.: US 12,224,126 B2
(45) Date of Patent: Feb. 11, 2025

(54) MULTILAYER ELECTRONIC COMPONENT

(71) Applicant: SAMSUNG ELECTRO-MECHANICS CO., LTD., Suwon-si (KR)

(72) Inventors: Hyung Jong Choi, Suwon-si (KR); Yoo Jeong Lee, Suwon-si (KR); Chung Yeol Lee, Suwon-si (KR); Kwang Yeun Won, Suwon-si (KR); So Jung An, Suwon-si (KR); Woo Kyung Sung, Suwon-si (KR); Myung Jun Park, Suwon-si (KR); Jong Ho Lee, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 112 days.

(21) Appl. No.: 17/961,490

(22) Filed: Oct. 6, 2022

(65) Prior Publication Data
US 2023/0162920 A1    May 25, 2023

(30) Foreign Application Priority Data
Nov. 24, 2021   (KR) .................. 10-2021-0163372

(51) Int. Cl.
*H01G 4/30*       (2006.01)
*H01G 4/232*      (2006.01)

(52) U.S. Cl.
CPC ............ *H01G 4/2325* (2013.01); *H01G 4/30* (2013.01)

(58) Field of Classification Search
CPC ........ H01G 4/30; H01G 4/232; H01G 4/2325; H01G 4/228; H01G 4/248

USPC ............... 361/301.4, 306.3, 321.1, 321.3
See application file for complete search history.

(56) References Cited

U.S. PATENT DOCUMENTS

| | | | |
|---|---|---|---|
| 2014/0321025 A1* | 10/2014 | Saito | H01G 4/232 205/181 |
| 2016/0379758 A1 | 12/2016 | Otani | |
| 2019/0148074 A1 | 5/2019 | Terashita et al. | |
| 2019/0355518 A1* | 11/2019 | Harada | H01G 4/30 |
| 2019/0392991 A1 | 12/2019 | Harada | |
| 2020/0118761 A1* | 4/2020 | Terashita | H01G 4/1209 |
| 2020/0176189 A1* | 6/2020 | Koo | H01G 4/2325 |
| 2021/0125780 A1* | 4/2021 | Hayashi | H01G 4/248 |

FOREIGN PATENT DOCUMENTS

| | | |
|---|---|---|
| EP | 0 777 242 A2 | 6/1997 |
| JP | 2019-220602 A | 12/2019 |
| KR | 10-0202500 B1 | 6/1999 |
| KR | 10-2017-0000768 A | 1/2017 |
| KR | 10-2019-0055752 A | 5/2019 |

* cited by examiner

*Primary Examiner* — Arun Ramaswamy
(74) *Attorney, Agent, or Firm* — Morgan, Lewis & Bockius LLP

(57) ABSTRACT

A multilayer electronic component includes a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction.

21 Claims, 6 Drawing Sheets

MULTILAYER ELECTRONIC COMPONENT

CROSS-REFERENCE TO RELATED APPLICATION

This application claims benefit of priority to Korean Patent Application No. 10-2021-0163372 filed on Nov. 24, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on printed circuit boards of various types of electronic products such as display devices including liquid crystal displays (LCDs) and plasma display panels (PDPs), computers, smartphones, cell phones, and the like to allow electricity to be charged therein and discharged therefrom.

Such MLCCs having advantages such as compactness, guaranteed high capacitance, and ease in mounting thereof may be used as a component of various electronic devices. As various electronic devices such as computers and mobile devices are miniaturized and have high output, demand for miniaturized and high-capacity multilayer ceramic capacitors has increased.

In addition, as the industry's interest in automotive electronic components has recently increased, multilayer ceramic capacitors are also required to have high reliability and high strength characteristics to be used in automobiles or infotainment systems.

Meanwhile, in the case of a multilayer ceramic capacitor mounted on a substrate, an external electrode may be formed using a resin including a conductive metal to improve resistance to bending stress. Through this, thermal and mechanical stress may be reduced using ductility of the resin, and cracks caused by bending of a substrate may be prevented.

However, when the external electrode includes a resin, there is a possibility that moisture resistance reliability may be weak due to the high water permeability of the resin. In order to prevent this, in the related art, a structure in which an internal electrode containing Ni and an external electrode containing Ni are in contact with each other on a surface of a body and a Ni—Sn alloy layer and a conductive resin layer containing a Sn conductive metal and a resin are sequentially present on the external electrode containing Ni has been introduced.

However, in the structure of the related art, when cracks occur due to an external impact, an Ni external electrode positioned on the innermost side of the external electrode may be corroded instead of Sn, and thus, defective exposure of the internal electrode may occur.

Accordingly, there is a need for a multilayer ceramic capacitor capable of improving resistance to bending stress and preventing defective exposure of internal electrodes when cracks occur.

SUMMARY

An aspect of the present disclosure may provide a multilayer electronic component having improved flexural strength characteristics.

An aspect of the present disclosure may also provide a multilayer electronic component having excellent moisture resistance reliability.

An aspect of the present disclosure may also improve a risk of corrosion of a portion in which an internal electrode and an external electrode are in contact with each other.

However, the purpose of the present disclosure is not limited to the above, and will be more easily understood in the course of describing specific exemplary embodiments of the present disclosure.

According to an aspect of the present disclosure, a multilayer electronic component includes: a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode disposed on the third surface of the body; and a second external electrode disposed on the fourth surface of the body, wherein the first and second external electrodes include a first electrode layer disposed on the third and fourth surfaces and including a conductive material, a second electrode layer disposed on the first electrode layer and including Ni, a third electrode layer disposed on the second electrode layer and including an Ni—Sn alloy; and a conductive resin layer disposed on the third electrode layer and including a conductive metal and a resin, wherein E1>E2 in which E1 is a standard reduction potential of the first electrode layer and E2 is a standard reduction potential of the second electrode layer According to another aspect of the present disclosure, a multilayer electronic component includes: a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode disposed on the third surface of the body; and a second external electrode disposed on the fourth surface of the body, wherein the first and second external electrodes include a plurality of first electrode layers disposed on the third and fourth surfaces and spaced apart from each other in the first direction, being in contact with the first internal electrode or the second internal electrode, and including a conductive material, a second electrode layer disposed on the plurality of first electrode layers and including Ni, a third electrode layer disposed on the second electrode layer and including an Ni—Sn alloy; and a conductive resin layer disposed on the third electrode layer and including conductive metals and resins, wherein E1>E2 in which E1 is a standard reduction potential of the plurality of first electrode layers and E2 is a standard reduction potential of the second electrode layers.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
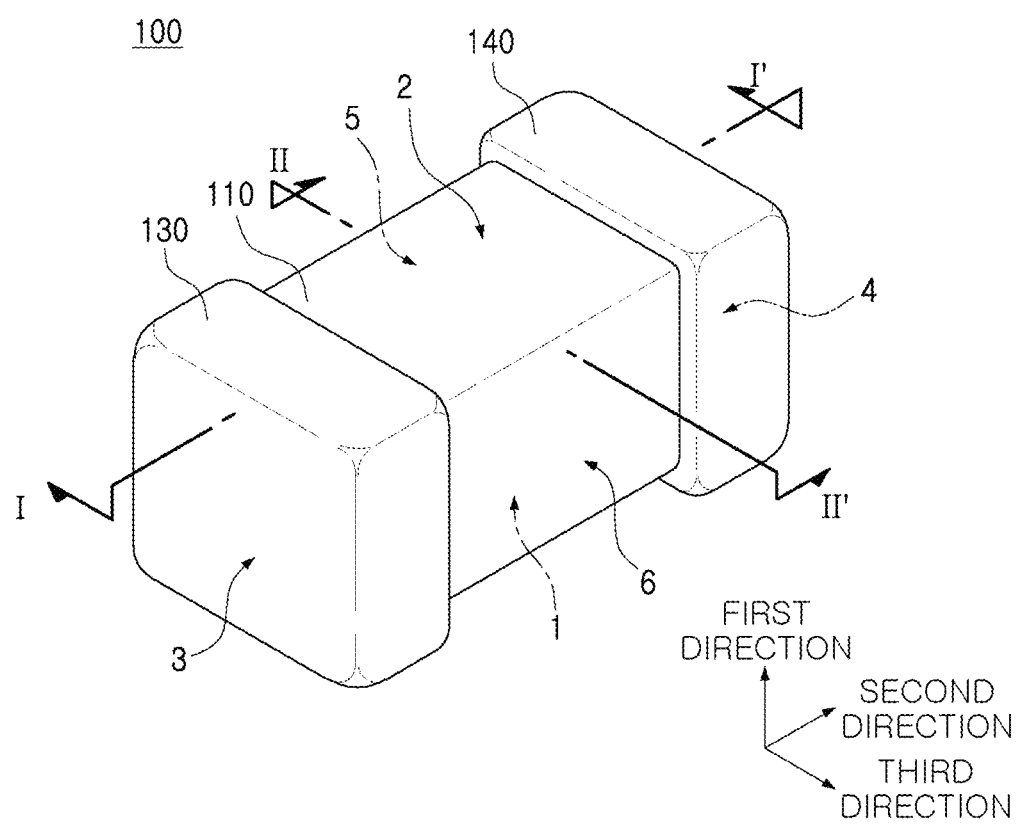
FIG. 1 is a perspective view schematically illustrating a multilayer electronic component according to an exemplary embodiment in the present disclosure.

Exemplary embodiments of the present disclosure will now be described in detail with reference to the accompanying drawings.

In the drawings, a first direction may be defined as a T direction, a stacking direction, or a thickness direction, a second direction may be defined as an L direction or a length direction, and a third direction may be defined as a W direction or a width direction.

Multilayer Electronic Component

FIG. 1 is a perspective view schematically illustrating a multilayer electronic component according to an exemplary embodiment in the present disclosure.

Figure 2:
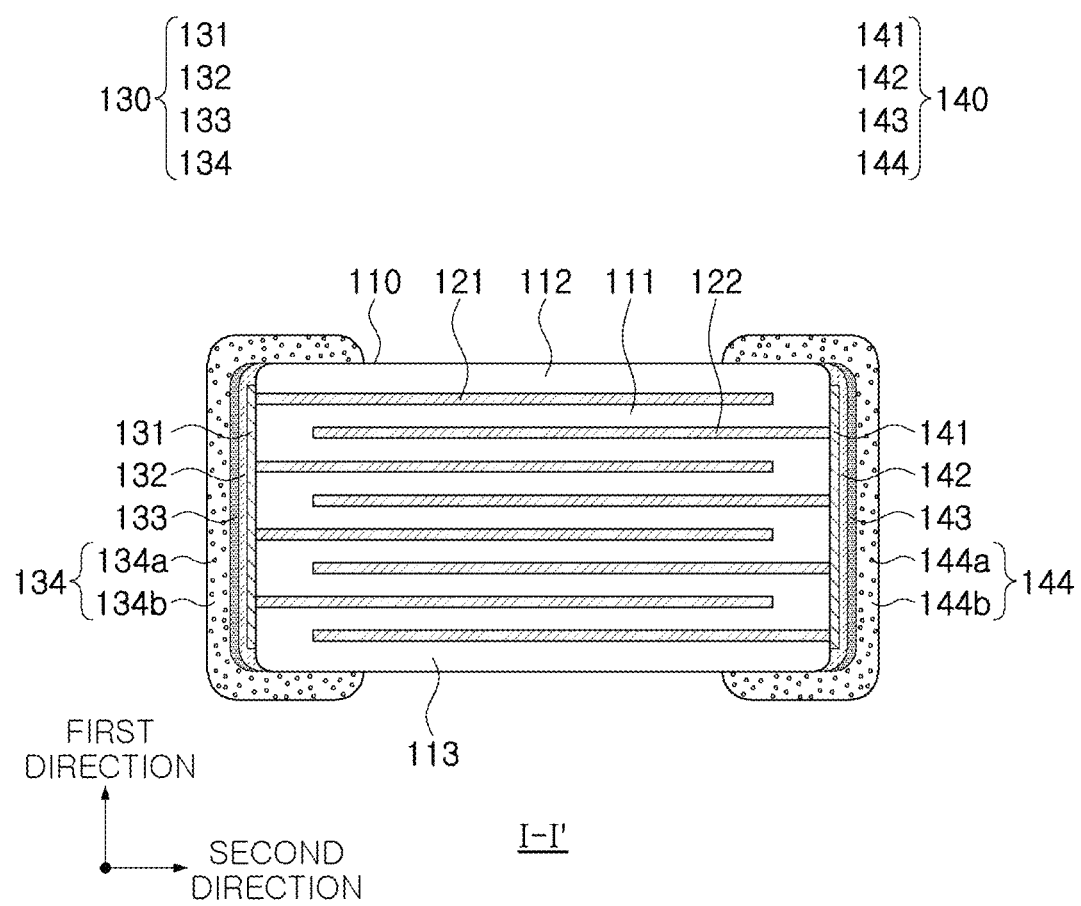
FIG. 2 is a cross-sectional view taken along line I-I' of FIG. 1.

FIG. 2 is a cross-sectional view taken along line I-I' of FIG. 1.

Figure 3:
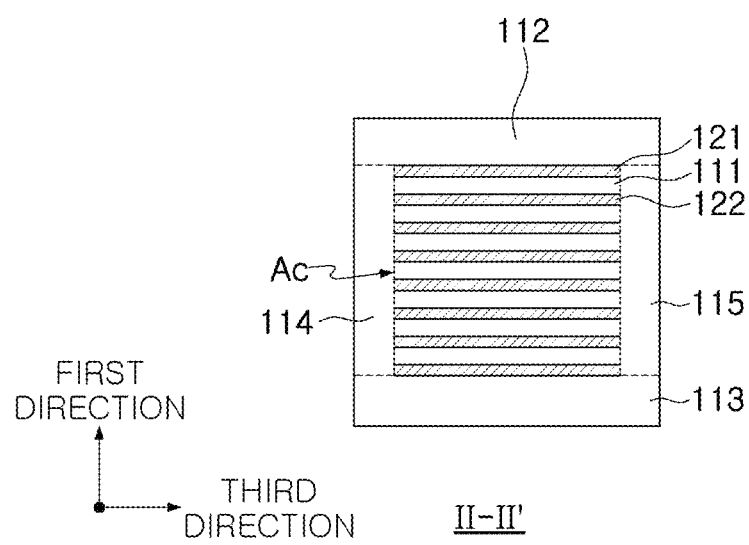
FIG. 3 is a cross-sectional view taken along II-II' of FIG. 1.

FIG. 3 is a cross-sectional view taken along II-II' of FIG. 1.

Figure 4:
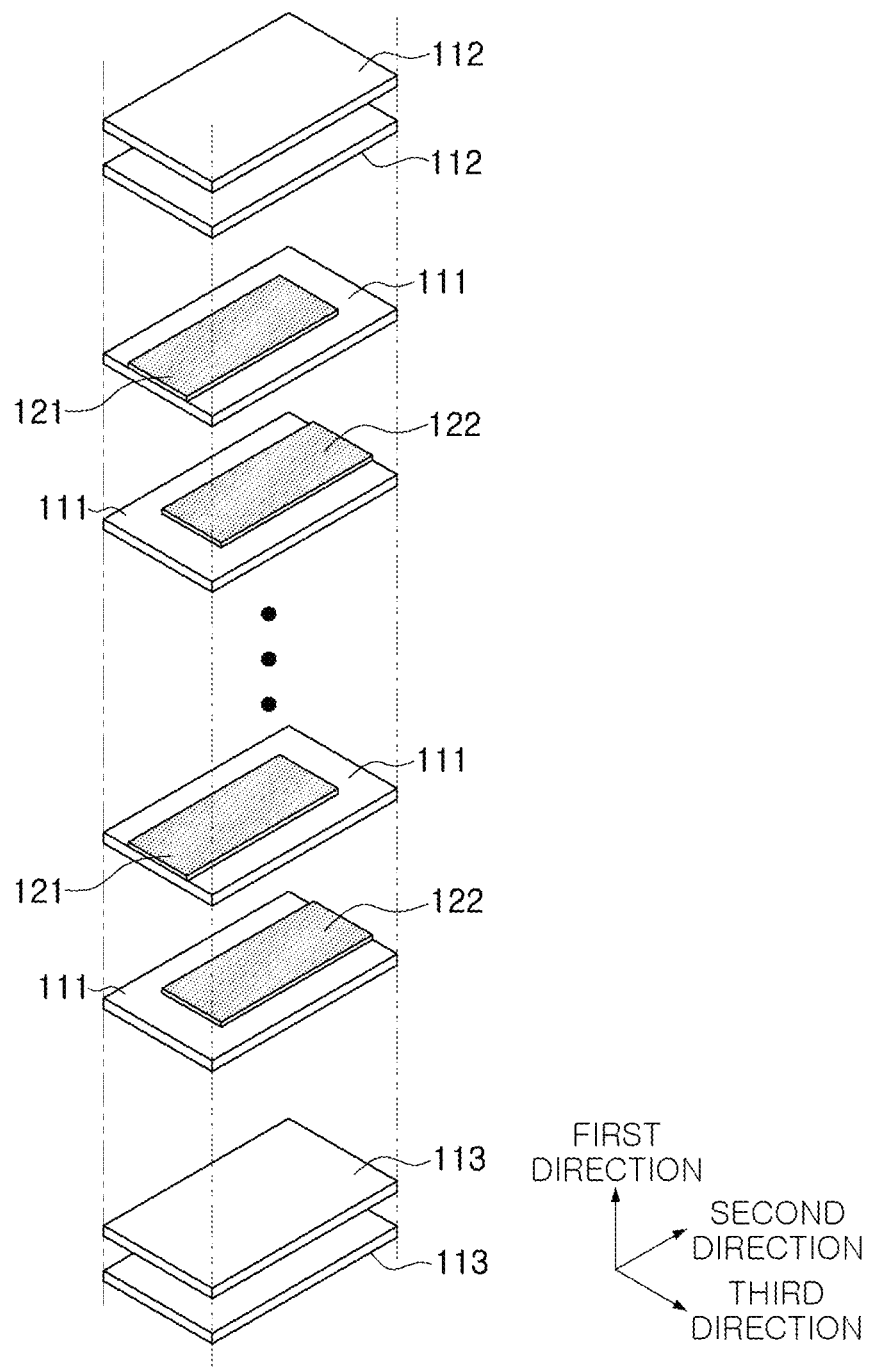
FIG. 4 is an exploded perspective view schematically illustrating an exploded body in which a dielectric layer and an internal electrode are stacked according to an exemplary embodiment in the present disclosure.

FIG. 4 is an exploded perspective view schematically illustrating an exploded body in which a dielectric layer and an internal electrode are stacked according to an exemplary embodiment in the present disclosure.

Hereinafter, a multilayer electronic component 100 according to an exemplary embodiment in the present disclosure will be described with reference to FIGS. 1 to 4.

The multilayer electronic component 100 according to an exemplary embodiment in the present disclosure may include a body 110 including a dielectric layer 111 and first and second internal electrodes 121 and 122 alternately disposed with the dielectric layer 111 interposed therebetween and including first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing in the third direction.

In the body 110, the dielectric layer 111 and the internal electrodes 121 and 122 are alternately stacked.

A specific shape of the body 110 is not limited, but, as illustrated, the body 110 may have a hexahedral shape or a shape similar thereto. Due to shrinkage of ceramic powder particle contained in the body 110 during sintering, the body 110 may not have a hexahedral shape with perfect straight lines but a substantially hexahedral shape.

The body 110 may include the first and second surfaces 1 and 2 opposing each other in the thickness direction (first direction), the third and fourth surfaces 3 and 4 connected to the first and second surfaces 1 and 2 and opposing each other in the length direction (second direction), and the fifth and sixth surfaces 5 and 6 connected to the first and second surfaces 1 and 2, connected to the third and fourth surfaces 3 and 4, and opposing each other in the width direction (third direction).

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particle, and the ceramic powder particle may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

As a material for forming the dielectric layer 111, various ceramic additives, organic solvents, plasticizers, binders, dispersants, or the like may be added to the powder particle such as barium titanate ($BaTiO_3$) or the like according to purposes of the present disclosure.

The body 110 may include a capacitance forming portion Ac disposed inside the body 110 and forming capacitance by including the first internal electrode 121 and the second internal electrode 122 disposed to oppose each other with the dielectric layer 111 interposed therebetween and upper and lower cover portions 112 and 113 formed on one and the other surfaces of the capacitance forming portion Ac in the first direction.

The capacitance forming portion Ac is a portion contributing to capacitance formation of a capacitor and may be formed by repeatedly stacking a plurality of first and second internal electrodes 121 and 122 with the dielectric layer 111 interposed therebetween.

The upper cover portion 112 and the lower cover portion 113 may be formed by stacking a single dielectric layer or two or more dielectric layers on the upper and lower surfaces of the capacitance forming portion Ac in the up-down direction, respectively, and basically play a role of preventing damage to the internal electrodes due to physical or chemical stress The upper cover portion 112 and the lower cover portion 113 do not include an internal electrode and may include the same material as that of the dielectric layer 111.

Margin portions 114 and 115 may be disposed on one surface and the other surface of the capacitance forming portion Ac in the third direction.

The margin portions 114 and 115 may include a margin portion 114 disposed on the sixth surface 6 of the body 110 and a margin portion 115 disposed on the fifth surface 5 of the body 110. That is, the margin portions 114 and 115 may be disposed on both sides of the ceramic body 110 in the width direction.

As shown in FIG. 3, the margin portions 114 and 115 may refer to a region between both ends of the first and second internal electrodes 121 and 122 and a boundary surface of the body 110 in a cross-section of the body 110 taken in the first and third directions (width-thickness) directions.

The margins 114 and 115 may basically serve to prevent damage to the internal electrodes due to physical or chemical stress.

The margin portions 114 and 115 may be formed by forming the internal electrodes by applying a conductive paste on a ceramic green sheet except for a portion in which the margin portions are to be formed.

In addition, in order to suppress a step difference due to the internal electrodes 121 and 122, the margin portions 114 and 115 may be formed by cutting the internal electrodes, after stacking, to be exposed to the fifth and sixth surfaces 5 and 6 of the body and then stacking a single dielectric layer or two or more dielectric layers on both side surfaces of the capacitance forming portion Ac in the width direction.

Referring to FIGS. 2 and 3, the plurality of internal electrodes 121 and 122 may be disposed to oppose each other with the dielectric layer 111 interposed therebetween.

The internal electrodes 121 and 122 may include first and second internal electrodes 121 and 122 alternately disposed to face each other with a dielectric layer interposed therebetween.

Referring to FIG. 2, the first internal electrode 121 may be spaced apart from the fourth surface 4 and may be connected to a first external electrode 130 on the third surface 3, and the second internal electrode 122 may be spaced apart from the third surface 3 and may be connected to a second external electrode 140 on the fourth surface 4.

That is, the first internal electrode 121 may not be connected to the second external electrode 140 but may be connected to the first external electrode 130, and the second internal electrode 122 may not be connected to the first external electrode 130 but may be connected to the second external electrode 140. Accordingly, the first internal electrode 121 may be formed to be spaced apart from the fourth surface 4 by a predetermined distance, and the second internal electrode 122 may be formed to be spaced apart from the third surface 3 by a predetermined distance.

The first and second internal electrodes 121 and 122 may be electrically isolated from each other by the dielectric layer 111 disposed therebetween.

Referring to FIG. 4, the body 110 may be formed by alternately stacking the dielectric layer 111 on which the first internal electrode 121 is printed and the dielectric layer on which the second internal electrode 122 is printed in the thickness direction (the first direction) and sintering a resultant structure.

The material for forming the internal electrodes 121 and 122 is not particularly limited, and a material having excellent electrical conductivity may be used. For example, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), or tungsten (W), titanium (Ti), and alloys thereof on a ceramic green sheet.

As a printing method of the conductive paste for internal electrodes, a screen printing method or a gravure printing method may be used but the present disclosure is not limited thereto.

The multilayer electronic component 100 according to an exemplary embodiment in the present disclosure may include the first external electrode 130 disposed on the third surface 3 of the body 110 and the second external electrode 140 disposed on the fourth surface 4 of the body 110.

In addition, the first and second external electrodes 130 and 140 of the multilayer electronic component 100 according to an exemplary embodiment in the present disclosure may include first electrodes 131 and 141 disposed on the third surface 3 and the fourth surface 4 of the body 110 and including a conductive material, second electrode layers 132 and 142 disposed on the first electrode layers 131 and 141 and including Ni, third electrodes layers 133 and 143 disposed on the second electrode layers 132 and 142 and including an Ni—Sn alloy, and conductive resin layers 134 and 144 disposed on the third electrodes layers 133 and 143 and including conductive metals 134a and 144a and resins 134b and 144b.

The first electrode layers 131 and 141 may be disposed on the third surface 3 and the fourth surface 4 of the body 110 and may be in direct contact with the internal electrodes 121 and 122 to connect the internal electrodes 121 and 122 and the first and second external electrodes 130 and 140 to each other. Specifically, the first electrode layer 131 included in the first external electrode 130 may be in direct contact with the first internal electrode 121 on the third surface 3 of the body 110, and the first electrode layer 141 included in the second external electrode 140 may be in direct contact with the second internal electrode 122 on the fourth surface 4 of the body 110. Accordingly, the first external electrode 130 may be electrically connected to the first internal electrode 121, and the second external electrode 140 may be electrically connected to the second internal electrode 122.

A type of the conductive material included in the first electrode layers 131 and 141 is not particularly limited, but may include a metal having a standard reduction potential greater than a standard reduction potential (−0.26V) of Ni. For example, the conductive material may include at least one of Cu, Ag, a Cu—Ni alloy, and an Ag—Ni alloy.

In an exemplary embodiment, the first electrode layers 131 and 141 may further include glass in addition to the conductive material. Accordingly, a bonding force between the first electrode layers 131 and 141 and the body 110 may be improved.

The method of forming the first electrode layers 131 and 141 is not particularly limited, but for example, the first electrode layers 131 and 141 may be plating layers formed through electrolytic plating, electroless plating, alloy plating, or the like, after pretreating the third and fourth surfaces 3 and 4 of the body 110 by sandblasting, ion milling, chemical etching, or the like, and may be sintered electrode layers formed by including a conductive material or may further including glass in addition to the conductive material.

The second electrode layers 132 and 142 may be disposed on the first electrode layers 131 and 141 and may include a conductive material such as Cu, Ni, or Pd. A type of conductive material included in the second electrode layers 132 and 142 is not particularly limited, but the second electrode layers 132 and 142 according to an exemplary embodiment may include Ni.

A method of forming the second electrode layers 132 and 142 is not particularly limited. For example, the second electrode layers 132 and 142 may be plating layers formed through an electrolytic plating method, an electroless plating method, or the like, and may be sintered electrode layers formed by including a conductive material or glass in addition to a conductive material.

The third electrode layers 133 and 143 may be disposed on the second electrode layers 132 and 142, and may include an intermetallic compound (IMC). The IMC included in the third electrode layers 133 and 134 may be IMC formed as conductive metals 134a and 144a included in the conductive resin layers 134 and 144 to be described below and the conductive material included in the second electrode layers 132 and 142 react with each other. For example, when the second electrode layers 132 and 142 include Ni and the conductive metals 134a and 144a included in the conductive resin layers 134 and 144 include Sn, the IMC included in the third electrode layers 133 and 143 may be an Ni—Sn alloy, specifically, $Ni_3Sn$, but is not limited thereto. Therefore, according to an exemplary embodiment, the Ni—Sn alloy included in the third electrode layer may be $Ni_3Sn$, $Ni_3Sn_2$, $Ni_3Sn_4$, or a mixture thereof.

A method of forming the third electrode layers 133 and 143 is not particularly limited. For example, the third electrode layers 133 and 143 may be formed as the conductive material included in the second electrode layers 132 and 142 and the conductive metals 134a and 144a included in the conductive resin layers 134 and 144 to be described below react with each other during a sintering process.

Meanwhile, when the external electrodes 130 and 140 include the conductive resin layers 134 and 144, the moisture resistance reliability of the multilayer electronic component 100 may be weakened due to the high water permeability of the resins 134b and 144b.

According to an exemplary embodiment in the present disclosure, since the third electrode layers 133 and 143 include the Ni—Sn alloy, moisture that has passed through the conductive resin layers 134 and 144 may not reach the body 110 or the internal electrodes 121 and 122, thereby improving moisture resistance reliability of the multilayer electronic component 100.

The conductive resin layers 134 and 144 may be disposed on the third electrode layers 133 and 134 and may include conductive metals 134a and 144a and resins 134b and 144b.

According to an exemplary embodiment, the conductive resin layers 134 and 144 may be disposed on the third electrode layers 133 and 143 and extend onto portions of the first and second surfaces 1 and 2 of the body 110. Accordingly, an occurrence of cracks in the multilayer electronic component 100 due to bending of the substrate or the like may be suppressed.

A component of the conductive metals 134a and 144a is not particularly limited as long as the component includes a metal having electrical conductivity, but preferably, the component of the conductive metals 134a and 144a may include a metal capable of forming an IMC with the conductive material included in the second electrode layers 132 and 142. Accordingly, the third electrode layers 133 and 143 may include an IMC.

In an exemplary embodiment, the conductive metals 134a and 144a may include Sn. Accordingly, Ni included in the second electrode layers 132 and 142 may react with Sn to form a Ni—Sn alloy in the third electrode layers 133 and 143.

In an exemplary embodiment, the conductive metals 134a and 144a may include at least one of Ag, Cu, and Ni in addition to Sn. Accordingly, the electrical conductivity of the conductive resin layers may be further improved.

The types of the resins 134b and 144b are not particularly limited, and may be a resin that is ductile to protect the multilayer electronic component 100 from bending stress and may have strong heat resistance, for example, a phenol resin, a urea resin, a diallyl phthalate resin, a melanin resin, a guanamine resin, an unsaturated polyester resin, a polyurethane resin, an epoxy resin, an aminoalkyd resin, a melamine-urea cocondensation resin, a silicon resin, a polysiloxane resin and the like, but is not limited thereto. In the case of using a resin, a curing agent such as a crosslinking agent and a polymerization initiator, a polymerization accelerator, a solvent, a viscosity modifier, and the like may be further added as needed.

In an exemplary embodiment, the conductive resin layers 134 and 144 may be disposed to extend onto portions of the first and second surfaces 1 and 2 of the body 110. Accordingly, the flexural strength of the multilayer electronic component 100 may be further improved.

Meanwhile, when cracks occur in the external electrodes 130 and 140 due to an external impact, if the first electrode layers 131 and 141 in direct contact with the internal electrodes are corroded ahead of the second electrode layers 132 and 142, defective exposure of the internal electrodes may occur and the reliability of the multilayer electronic component 100 cannot be secured.

Specifically, when the first electrode layers 131 and 141 and the second electrode layers 132 and 142, which are in contact with each other, are exposed to moisture due to the occurrence of cracks, a potential difference may occur and a current may flow between the metals. At this time, a metal with a low standard reduction potential may be oxidized and corroded first.

At this time, if the standard reduction potential of the first electrode layers 131 and 141 is lower than the standard reduction potential of the second electrode layers 132 and 142, the first electrode layers 131 and 141 in direct contact with the internal electrodes 121 and 122 may be corroded first, so defective exposure of the internal electrodes may occur.

According to the multilayer electronic component 100 according to an exemplary embodiment in the present disclosure, when the standard reduction potential of the first electrode layers 131 and 141 is E1 and the standard reduction potential of the second electrode layers 132 and 142 is E2, E1>E2 may be satisfied. Accordingly, even when cracks occur in the external electrodes 130 and 140 and are exposed to external moisture, corrosion of the first electrode layers 131 and 141 may be prevented, thereby suppressing defective exposure of the internal electrodes.

There may be various methods for making E1 and E2 satisfy E1>E2. For example, when the second electrode layers 132 and 142 are formed of Ni, since the standard reduction potential of Ni is −0.26V, a conductive material of the first electrode layers 131 and 141 may include a metal having a standard reduction potential greater than −0.26 and a content thereof may be adjusted, but the present disclosure is not limited thereto.

A method of measuring the standard reduction potentials E1 and E2 of the first electrode layers 131 and 141 and the second electrode layers 132 and 142 and comparing their magnitude is as follows.

A sample of the multilayer electronic component 100 according to an exemplary embodiment in the present disclosure is prepared and the W-T surface of the external electrodes are polished so that the second electrode layers 132 and 142 are exposed. Thereafter, the standard reduction potentials E2 of the second electrode layers 132 and 142 are measured, the W-T surfaces of the external electrodes are polished so that the first electrode layers 131 and 141 are exposed, and then the standard reduction potentials E1 of the first electrode layers 131 and 141 are measured and magnitudes of the standard reduction potentials E1 of the first electrode layers 131 and 141 may be compared.

The standard reduction potentials E1 and E2 may be determined by measuring an oxidation reduction potential compared to a potential of a specific reference electrode.

The type of metal having a standard reduction potential greater than the standard reduction potential of Ni is not particularly limited. However, since the standard reduction potential of Cu is 0.34V, when Cu is included in the first electrode layers 131 and 141, the standard reduction potential E1 of the first electrode layers 131 and 141 may be greater in a positive (+) direction than the standard reduction potential E2 of the second electrode layers 132 and 142 including Ni. In addition, the external electrodes 130 and

140 may be formed at low cost, compared to other metals having a standard reduction potential higher than the standard reduction potential of Ni. In addition, Cu has good bonding properties with Ni, so that a first electrode layer containing Cu may strengthen bonding strength with the internal electrode containing Ni.

According to an exemplary embodiment, the conductive material included in the first electrode layers 131 and 141 may include at least one of Cu and a Cu—Ni alloy, so that the first electrode layers 131 and 141 may be prevented from being corroded ahead of the second electrode layers 132 and 142, thereby suppressing defective exposure of the internal electrodes 121 and 122.

Meanwhile, a standard reduction potential of Ag is 0.80V. Therefore, when Ag is included in the first electrode layers 131 and 141, the standard reduction potential E1 of the first electrode layers 131 and 141 may be greater than the standard reduction potential E2 of the second electrode layers 132 and 142 including Ni in the positive (+) direction. Since the standard reduction potential of Ag has a relatively larger value than those of other metals that may be used in the external electrode, the standard reduction potential E1 of the first electrode layers 131 and 141 may be increased even with a small content.

According to an exemplary embodiment, the conductive material included in the first electrode layers 131 and 141 may include at least one of Ag and an Ag—Ni alloy, so that the first electrode layers 131 and 141 may be prevented from being corroded ahead of the second electrode layers 132 and 142, thereby suppressing defective exposure of the internal electrodes 121 and 122.

Hereinafter, a multilayer electronic component 101 according to another exemplary embodiment in the present disclosure will be described, but portions overlapping the multilayer electronic component 100 according to the exemplary embodiment will be omitted.

Figure 5:
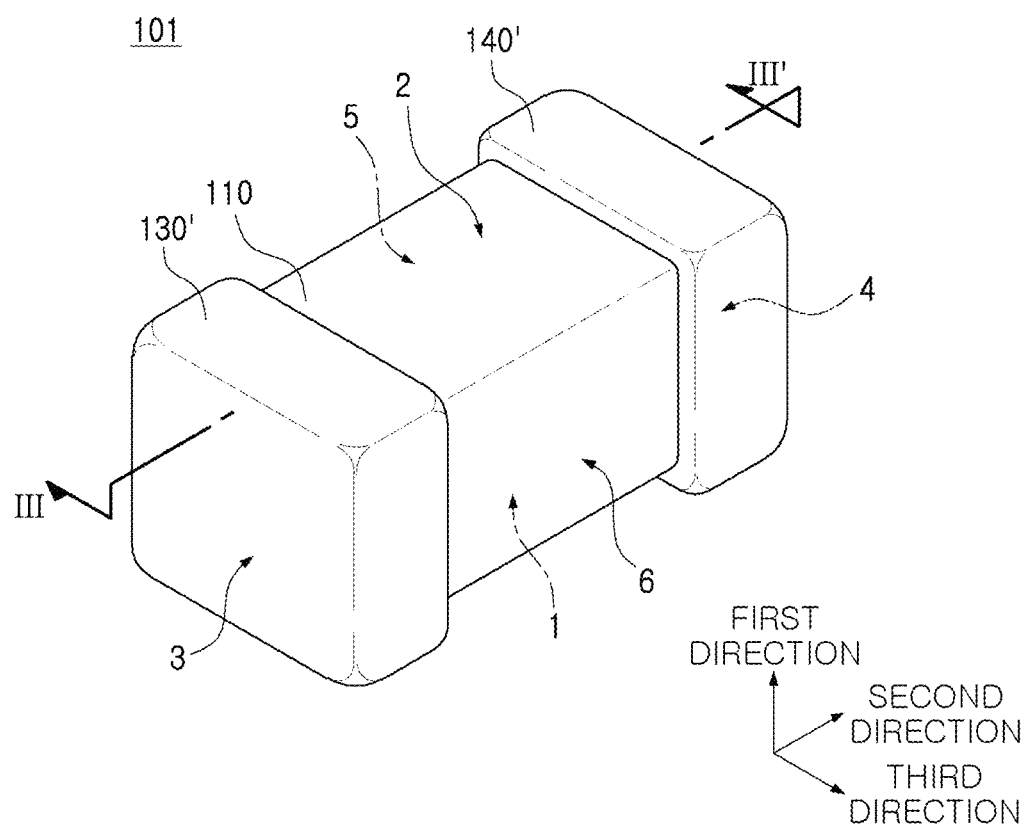
FIG. 5 is a perspective view schematically illustrating a multilayer electronic component according to another exemplary embodiment in the present disclosure.

FIG. 5 is a perspective view schematically illustrating the multilayer electronic component 101 according to another exemplary embodiment in the present disclosure.

Figure 6:
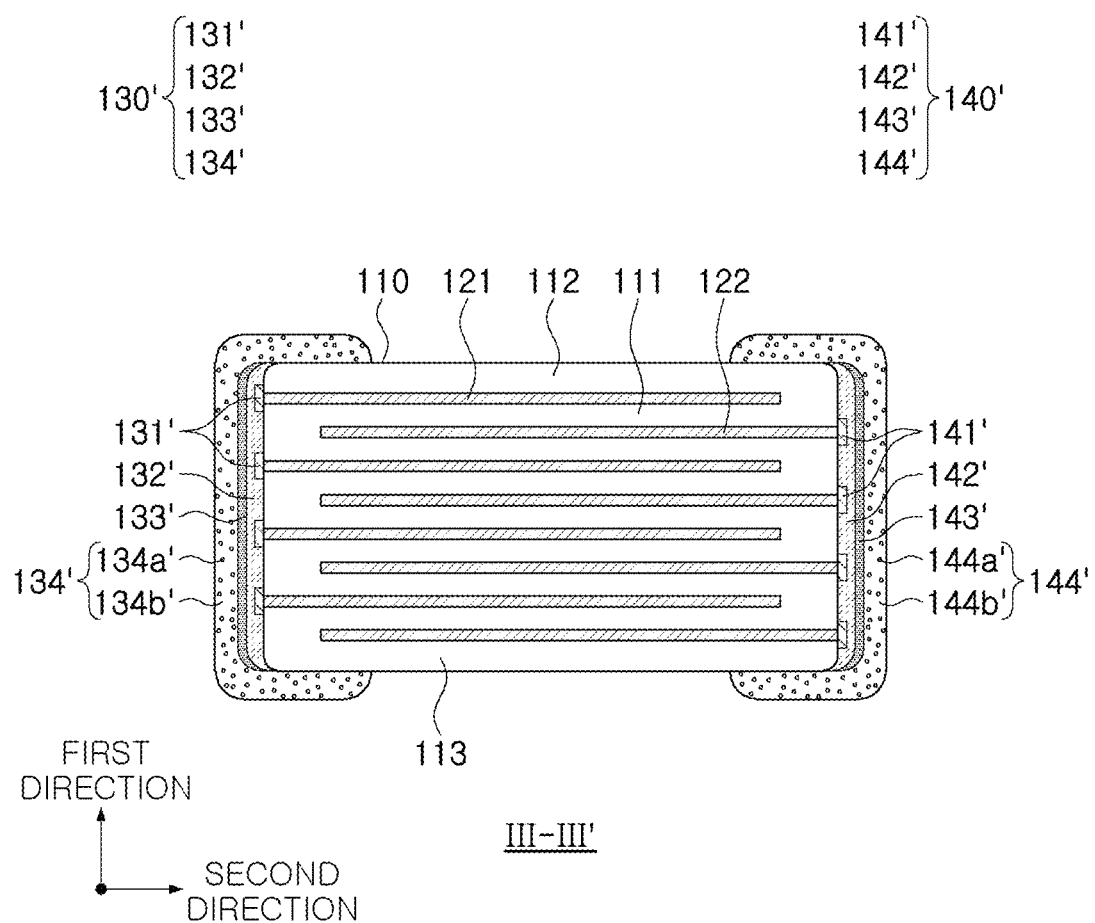
FIG. 6 is a cross-sectional view taken along line III-III' of FIG. 5.

FIG. 6 is a cross-sectional view taken along line III-III' of FIG. 5.

Hereinafter, the multilayer electronic component 101 according to another exemplary embodiment in the present disclosure will be described with reference to FIGS. 5 and 6.

The multilayer electronic component 101 according to another exemplary embodiment in the present disclosure may include a body 110 including a dielectric layer 111 and first and second internal electrodes 121 and 122 alternately disposed with the dielectric layer 111 interposed therebetween and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces and opposing each other in the third direction; a first external electrode 130' disposed on the third surface of the body 110; and a second external electrode 140' disposed on the fourth surface 4 of the body 110. The first and second external electrodes 130' and 140' may include a plurality of first electrode layers 131' and 141' disposed on the third and fourth surfaces 3 and 4 and spaced apart from each other in the first direction, being in contact with the first internal electrode 121 or the second internal electrode 122, and including a conductive material, second electrode layer 132' and 142' disposed on the plurality of first electrode layers 131' and 141' and including Ni, third electrode layers 133' and 143' disposed on the second electrode layers 132' and 142' and including an Ni—Sn alloy; and conductive resin layers 134' and 144' disposed on the third electrode layers 133' and 143' and including conductive metal 134a' and 144a' and resins 134b' and 144b', wherein E1>E2 in which E1 is a standard reduction potential of the plurality of first electrode layers and E2 is a standard reduction potential of the second electrode layers 132' and 142'.

Referring to FIG. 5, the multilayer electronic component 101 according to another exemplary embodiment in the present disclosure may include the first external electrode 130' disposed on the third surface 3 of the body and the second external electrode 140' disposed on the fourth surface 4 of the body.

Referring to FIG. 6, the first and second external electrodes 130' and 140' of the multilayer electronic component 101 according to another exemplary embodiment in the present disclosure may include a plurality of first electrode layers 131' and 141' disposed on the third surface 3 and the fourth surface 4 and spaced apart from each other in the first direction, being in contact with the first internal electrode 121 or the second internal electrode 122, and including a conductive material, the second electrode layers 132' and 142' disposed on the plurality of first electrode layers 131' and 141' and including Ni, the third electrodes 133' and 143' disposed on the second electrodes 132' and 142' and including an Ni—Sn alloy, and conductive resin layers 134' and 144' disposed on the third electrode layers and including conductive metals 134a' and 144a' and resins 134b' and 144b'.

The plurality of first electrode layers 131' and 141' may be disposed on the third surface 3 and the fourth surface 4 of the body 110 and may be in direct contact with the internal electrodes 121 and 122 to connect the internal electrodes 121 and 122 and the first and second eternal electrodes 130' and 140'. Specifically, the plurality of first electrode layers 131' included in the first external electrode 130' may be in direct contact with the first internal electrode 121 on the third surface 3 of the body 110, and the plurality of first electrode layers 141' included in the second external electrode 140' may be in direct contact with the second internal electrode 122 on the fourth surface 4 of the body 110. Accordingly, the first external electrode 130' may be electrically connected to the first internal electrode 121, and the second external electrode 140' may be electrically connected to the second internal electrode 122.

The plurality of first electrode layers 131' and 141' may be disposed on the third surface 3 and the fourth surface 4, may be spaced apart from each other in the first direction, and may be in contact with the first internal electrode 121 or the second internal electrode 122. Accordingly, the proportion of the plurality of first electrode layers 131' and 141' in the external electrodes 130' and 140' may be minimized, so that the external electrodes 130' and 140' may be formed to be thin.

The plurality of first electrode layers 131' and 141' may include a conductive material. The type of the conductive material is not particularly limited, but preferably includes a metal having a standard reduction potential greater than the standard reduction potential (−0.26V) of Ni. For example, the conductive material may include at least one of Cu, Ag, a Cu—Ni alloy, and an Ag—Ni alloy.

In an exemplary embodiment, the plurality of first electrode layers 131' and 141' may further include glass in addition to the conductive material. Accordingly, the bonding force between the plurality of first electrode layers 131' and 141' and the body 110 may be improved.

A method of forming the plurality of first electrode layers 131' and 141' is not particularly limited, but, for example, the plurality of first electrode layers 131' and 141' may be plating layers formed using an electrolytic plating method, an electroless plating method, an alloy plating method, or the like after pretreating the third and fourth surfaces 3 and 4 of the body 110 by sandblasting, ion milling, chemical etching, or the like The second electrode layers 132' and 142' may be disposed on the plurality of first electrode layers 131' and 141', and may include a conductive material such as Cu, Ni, or Pd. The type of a conductive material included in the second electrode layers 132' and 142' is not particularly limited, but the second electrode layers 132' and 142' according to another exemplary embodiment in the present disclosure may include Ni.

A method of forming the second electrode layers 132' and 142' is not particularly limited. For example, the second electrode layers 132' and 142' may be plating layers formed using an electrolytic plating method, an electroless plating method, etc, and may be sintered electrode layers formed to include a conductive material or further include glass in addition to the conductive material.

Meanwhile, the plurality of first electrode layers 131' and 141' may be disposed spaced apart from each other in the first direction and be in contact with the first internal electrode 121 or the second internal electrode 122, so that there may be a region not covered by the plurality of first electrode layers 131' and 141' in the third and fourth surfaces 3 and 4 of the body 110. Accordingly, the region not covered by the plurality of first electrode layers 131' and 141' in the third and fourth surfaces 3 and 4 may be covered by the second electrode layers 132' and 142'.

The third electrode layers 133' and 134' may be disposed on the second electrode layers 132 and 142, and may include an intermetallic compound (IMC). The IMC included in the third electrode layers 133' and 134' may be IMC formed as conductive metals 134a' and 144a' included in the conductive resin layers 133' and 144' to be described below and the conductive material included in the second electrode layers 132 and 142 react with each other. For example, when the second electrode layers 132' and 142' include Ni and the conductive metals 134a' and 144a' included in the conductive resin layers 134' and 144' include Sn, the IMC included in the third electrode layers 133' and 143' may be an Ni—Sn alloy, specifically, $Ni_3Sn$, but is not limited thereto. Therefore, according to an exemplary embodiment, the Ni—Sn alloy included in the third electrode layer may be $Ni_3Sn$, $Ni_3Sn_2$, $Ni_3Sn_4$, or a mixture thereof.

A method of forming the third electrode layers 133' and 143' is not particularly limited. For example, the third electrode layers 133' and 143' may be formed as the conductive material included in the second electrode layers 132' and 142' and the conductive metals 134a' and 144a' included in the conductive resin layers 134' and 144' to be described below react with each other during a sintering process.

Meanwhile, when the external electrodes 130' and 140' include the conductive resin layers 134' and 144', the moisture resistance reliability of the multilayer electronic component 101 may be weakened due to the high water permeability of the resins 134b' and 144b'.

According to an exemplary embodiment in the present disclosure, since the third electrode layers 133' and 143' include the Ni—Sn alloy, moisture that has passed through the conductive resin layers 134' and 144' may not reach the body 110 or the internal electrodes 121' and 122', thereby improving moisture resistance reliability of the multilayer electronic component 101'.

The conductive resin layers 134 and 144 may be disposed on the third electrode layers 133' and 143' and may include conductive metals 134a' and 144a' and resins 134b' and 144b'.

According to an exemplary embodiment, the conductive resin layers 134' and 144' may be disposed on the third electrode layers 133' and 143' and extend onto portions of the first and second surfaces 1 and 2 of the body 110. Accordingly, an occurrence of cracks in the multilayer electronic component 101 due to bending of the substrate or the like may be suppressed.

A component of the conductive metals 134a' and 144a' is not particularly limited as long as the component includes a metal having electrical conductivity, but preferably, the component of the conductive metals 134a and 144a' may include a metal capable of forming an IMC with the conductive material included in the second electrode layers 132' and 142'. Accordingly, the third electrode layers 133' and 143' may include an IMC.

In an exemplary embodiment, the conductive metals 134a' and 144a' may include Sn. Accordingly, Ni included in the second electrode layers 132' and 142' may react with Sn to form a Ni—Sn alloy in the third electrode layers 133' and 143'.

In an exemplary embodiment, the conductive metals 134a' and 144a' may include at least one of Ag, Cu, and Ni in addition to Sn. Accordingly, the electrical conductivity of the conductive resin layers may be further improved.

The types of the resins 134b and 144b are not particularly limited, and may be a resin that is ductile to protect the multilayer electronic component 101 from bending stress and may have strong heat resistance, for example, a phenol resin, a urea resin, a diallyl phthalate resin, a melanin resin, a guanamine resin, an unsaturated polyester resin, a polyurethane resin, an epoxy resin, an aminoalkyd resin, a melamine-urea cocondensation resin, a silicon resin, a polysiloxane resin and the like, but is not limited thereto. In the case of using a resin, a curing agent such as a crosslinking agent and a polymerization initiator, a polymerization accelerator, a solvent, a viscosity modifier, and the like may be further added as needed.

In an exemplary embodiment, the conductive resin layers 134' and 144' may be disposed to extend onto portions of the first and second surfaces 1 and 2 of the body 110. Accordingly, the flexural strength of the multilayer electronic component 101 may be further improved.

Meanwhile, when cracks occur in the external electrodes 130 and 140' due to an external impact, if the plurality of first electrode layers 131' and 141' in contact with the internal electrodes are corroded ahead of the second electrode layers 132' and 142', defective exposure of the internal electrodes may occur and the reliability of the multilayer electronic component 101 cannot be secured.

Specifically, when the first electrode layers 131' and 141' and the second electrode layers 132' and 142', which are in contact with each other, are exposed to moisture due to the occurrence of cracks, a potential difference may occur and a current may flow between the metals. At this time, a metal with a low standard reduction potential may be oxidized and corroded first.

At this time, if the standard reduction potential of the plurality of first electrode layers 131' and 141' is lower than the standard reduction potential of the second electrode layers 132' and 142', the plurality of first electrode layers 131' and 141' in contact with the internal electrodes 121 and 122 may be corroded first, so defective exposure of the internal electrodes may occur.

According to the multilayer electronic component 101 according to another exemplary embodiment in the present disclosure, when the standard reduction potential of the first electrode layers 131' and 141' is E1and the standard reduction potential of the second electrode layers 132' and 142' is E2, E1>E2 may be satisfied. Accordingly, even when cracks occur in the external electrodes 130' and 140' and are exposed to external moisture, corrosion of the first electrode layers 131' and 141' may be prevented, thereby suppressing defective exposure of the internal electrodes.

There may be various methods for making E1 and E2 satisfy E1>E2. For example, when the second electrode layers 132' and 142' are formed of Ni, since the standard reduction potential of Ni is −0.26V, a conductive material of the plurality of first electrode layers 131' and 141' may include a metal having a standard reduction potential greater than −0.26 and a content thereof may be adjusted, but the present disclosure is not limited thereto.

The standard reduction potentials E1 and E2 of the plurality of first electrode layers 131' and 141' and the second electrode layers 132' and 142' may be measured by the same method as the method for measuring the standard reduction potential of the first electrode layers 131 and 141 and the second electrode layers 132 and 142 of the multilayer electronic component 100 according to an exemplary embodiment in the present disclosure.

The type of metal having a standard reduction potential greater than the standard reduction potential of Ni is not particularly limited. However, since the standard reduction potential of Cu is 0.34 V, when Cu is included in the plurality of first electrode layers 131' and 141', the standard reduction potential E1 of the plurality of first electrode layers 131' and 141' may be greater than the standard reduction potential E2 of the second electrode layers 132' and 142' including Ni in the positive (+) direction. In addition, the external electrodes 130' and 140' may be formed at low cost, compared to other metals having a standard reduction potential higher than the standard reduction potential of Ni.

According to an exemplary embodiment, the conductive material included in the plurality of first electrode layers 131' and 141' includes at least one of Cu and a Cu—Ni alloy, so that the plurality of first electrode layers 131' and 141' may be prevented from being corroded ahead of the second electrode layers 132' and 142', thereby suppressing defective exposure of the internal electrodes 121 and 122.

Meanwhile, a standard reduction potential of Ag is 0.80V. Thus, when Ag is included in the plurality of first electrode layers 131' and 141', the standard reduction potential E1 of the plurality of first electrode layers 131' and 141' may be greater than the standard reduction potential E2 of the second electrode layers 132' and 142' including Ni in the positive (+) direction. Since the standard reduction potential of Ag has a larger value than that of other metals, the standard reduction potential E1 of the plurality of first electrode layers 131' and 141' may be improved even with a small content.

According to an exemplary embodiment, the conductive material included in the plurality of first electrode layers 131' and 141' includes at least one of Ag and an Ag—Ni alloy, so that the plurality of first electrode layers 131' and 141' may be prevented from being corroded ahead of the second electrode layers 132' and 142', thereby suppressing defective exposure of the internal electrodes 121 and 122.

One of the several effects of the present disclosure is to improve moisture resistance reliability by suppressing penetration of moisture into the multilayer electronic component from the outside.

One of the various effects of the present disclosure is to improve resistance to bending stress using ductility of the conductive resin layer.

One of the various effects of the present disclosure is to improve a risk of corrosion of a portion in which the internal electrodes and the external electrodes are in contact with each other even when cracks occur due to bending stress.

However, various and beneficial advantages and effects of the present disclosure are not limited to the above, and will be more easily understood in the process of describing specific exemplary embodiments of the present disclosure.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
   a first external electrode disposed on the third surface of the body; and
   a second external electrode disposed on the fourth surface of the body,
   wherein one of the first and second external electrodes includes a first electrode layer disposed on one of the third and fourth surfaces and including a conductive material, a second electrode layer disposed on the first electrode layer and including Ni and glass, a third electrode layer disposed on the second electrode layer and including an Ni—Sn alloy, and a conductive resin layer disposed on the third electrode layer and including a conductive metal and a resin,
   wherein E1>E2 in which E1 is a standard reduction potential of the first electrode layer and E2 is a standard reduction potential of the second electrode layer.

2. The multilayer electronic component of claim 1, wherein the conductive material included in the first electrode layer includes one or more of Cu and a Cu—Ni alloy.

3. The multilayer electronic component of claim 1, wherein the conductive material included in the first electrode layer includes one or more of Ag and an Ag—Ni alloy.

4. The multilayer electronic component of claim 1, wherein the first electrode layer further includes glass.

5. The multilayer electronic component of claim 1, wherein the Ni—Sn alloy includes $Ni_3Sn$, $Ni_3Sn_2$, $Ni_3Sn_4$, or a mixture thereof.

6. The multilayer electronic component of claim 1, wherein the conductive resin layer extends onto portions of the first and second surfaces of the body.

7. The multilayer electronic component of claim 1, wherein the conductive metal includes Sn, and the resin includes an epoxy resin.

8. The multilayer electronic component of claim 7, wherein the conductive metal further includes at least one of Ag, Cu, and Ni.

9. A multilayer electronic component comprising:
a body including a dielectric layer and first and second internal electrodes disposed to oppose each other with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode disposed on the third surface of the body; and
a second external electrode disposed on the fourth surface of the body,
wherein one of the first and second external electrodes includes:
a plurality of first electrode layers disposed on one of the third and fourth surfaces and spaced apart from each other in the first direction, being in contact with the first internal electrodes or the second internal electrodes, and including a conductive material,
a second electrode layer disposed on the plurality of first electrode layers and including Ni,
a third electrode layer disposed on the second electrode layer and including an Ni—Sn alloy; and
a conductive resin layer disposed on the third electrode layer and including a conductive metal and a resin,
wherein E1>E2 in which E1 is a standard reduction potential of the plurality of first electrode layers and E2 is a standard reduction potential of the second electrode layer.

10. The multilayer electronic component of claim 9, wherein the conductive material included in the plurality of first electrode layers includes one or more of Cu and a Cu—Ni alloy.

11. The multilayer electronic component of claim 9, wherein the conductive material included in the plurality of first electrode layers includes one or more of Ag and an Ag—Ni alloy.

12. The multilayer electronic component of claim 9, wherein the plurality of first electrode layers further include glass.

13. The multilayer electronic component of claim 9, wherein the Ni—Sn alloy includes $Ni_3Sn$, $Ni_3Sn_2$, $Ni_3Sn_4$, or a mixture thereof.

14. The multilayer electronic component of claim 9, wherein the conductive resin layers extend onto portions of the first and second surfaces of the body.

15. The multilayer electronic component of claim 9, wherein the conductive metal includes Sn, and the resin includes an epoxy resin.

16. The multilayer electronic component of claim 15, wherein the conductive metal further includes at least one of Ag, Cu, and Ni.

17. A multilayer electronic component comprising:
a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode disposed on the third surface of the body; and
a second external electrode disposed on the fourth surface of the body,
wherein one of the first and second external electrodes includes a first electrode layer disposed on one of the third and fourth surfaces and including a first conductive material and glass, a second electrode layer disposed on the first electrode layer and including a second conductive material and glass, and a conductive resin layer disposed on the second electrode layer and including a third conductive metal and a resin,
wherein E1>E2 in which E1 is a standard reduction potential of the first electrode layer and E2 is a standard reduction potential of the second electrode layer, and
the first electrode layer includes a plurality of patterns spaced apart from each other.

18. The multilayer electronic component of claim 17, wherein the first conductive material includes one or more of Cu, a Cu—Ni alloy, Ag, and an Ag—Ni alloy.

19. The multilayer electronic component of claim 17, wherein the second conductive material includes Ni, and the second electrode layer includes a sintered electrode.

20. The multilayer electronic component of claim 19, wherein the third conductive metal includes Sn.

21. The multilayer electronic component of claim 20, wherein the third conductive metal further includes at least one of Ag, Cu, and Ni.

* * * * *